United States Patent
Belcea

(10) Patent No.: US 7,171,220 B2
(45) Date of Patent: Jan. 30, 2007

(54) SYSTEM AND METHOD FOR ANALYZING THE PRECISION OF GEO-LOCATION SERVICES IN A WIRELESS NETWORK TERMINAL

(75) Inventor: John M. Belcea, West Melbourne, FL (US)

(73) Assignee: MeshNetworks, Inc., Maitland, FL (US)

( * ) Notice: Subject to any disclaimer, the term of this patent is extended or adjusted under 35 U.S.C. 154(b) by 278 days.

(21) Appl. No.: 10/799,398

(22) Filed: Mar. 12, 2004

(65) Prior Publication Data

US 2004/0179667 A1   Sep. 16, 2004

Related U.S. Application Data

(60) Provisional application No. 60/454,332, filed on Mar. 14, 2003.

(51) Int. Cl.
*H04Q 7/20* (2006.01)
(52) U.S. Cl. .......... 455/457; 455/456.2; 455/456.6; 340/995.1; 340/995.16; 701/200; 701/214; 709/204
(58) Field of Classification Search .......... 455/457, 455/456.2, 456.6, 416, 456.5; 340/995.1, 340/995.16; 701/200, 214; 709/204
See application file for complete search history.

(56) References Cited

U.S. PATENT DOCUMENTS

| | | | |
|---|---|---|---|
| 4,494,192 A | 1/1985 | Lew et al. | |
| 4,617,656 A | 10/1986 | Kobayashi et al. | |
| 4,736,371 A | 4/1988 | Tejima et al. | |
| 4,742,357 A | 5/1988 | Rackley | |
| 4,747,130 A | 5/1988 | Ho | |
| 4,910,521 A | 3/1990 | Mellon | |
| 5,034,961 A | 7/1991 | Adams | |
| 5,068,916 A | 11/1991 | Harrison et al. | |
| 5,231,634 A | 7/1993 | Giles et al. | |
| 5,233,604 A | 8/1993 | Ahmadi et al. | |
| 5,241,542 A | 8/1993 | Natarajan et al. | |
| 5,317,566 A | 5/1994 | Joshi | |
| 5,392,450 A | 2/1995 | Nossen | |
| 5,412,654 A | 5/1995 | Perkins | |
| 5,424,747 A | 6/1995 | Chazelas et al. | |

(Continued)

FOREIGN PATENT DOCUMENTS

CA   2132180   3/1996

(Continued)

OTHER PUBLICATIONS

Wong, et al., "Soft Handoffs in CDMA Mobile Systems," Dec. 1997, IEEE Personal Communications.

(Continued)

*Primary Examiner*—Danh Cong Le
(74) *Attorney, Agent, or Firm*—Randi L. Karpinia; Joseph J. Buczynski

(57) ABSTRACT

A system and method for presenting an interactive visual feedback, based upon input parameters, indicating quality levels in terminal location detection in a network at selectable points on a map. The system and method includes an application in which a user provides information regarding network terminals, terminal locations, and map parameters. In response, the application then provides a visual indication of expected accuracy in geo-location calculations for terminals at specific points in a network map.

18 Claims, 16 Drawing Sheets

U.S. PATENT DOCUMENTS

| | | | |
|---|---|---|---|
| 5,502,722 A | 3/1996 | Fulghum | |
| 5,517,491 A | 5/1996 | Nanni et al. | |
| 5,555,425 A | 9/1996 | Zeller et al. | |
| 5,555,540 A | 9/1996 | Radke | |
| 5,572,528 A | 11/1996 | Shuen | |
| 5,615,212 A | 3/1997 | Ruszczyk et al. | |
| 5,618,045 A | 4/1997 | Kagan et al. | |
| 5,621,732 A | 4/1997 | Osawa | |
| 5,623,495 A | 4/1997 | Eng et al. | |
| 5,627,976 A | 5/1997 | McFarland et al. | |
| 5,631,897 A | 5/1997 | Pacheco et al. | |
| 5,644,576 A | 7/1997 | Bauchot et al. | |
| 5,652,751 A | 7/1997 | Sharony | |
| 5,680,392 A | 10/1997 | Semaan | |
| 5,684,794 A | 11/1997 | Lopez et al. | |
| 5,687,194 A | 11/1997 | Paneth et al. | |
| 5,696,903 A | 12/1997 | Mahany | |
| 5,701,294 A | 12/1997 | Ward et al. | |
| 5,706,428 A | 1/1998 | Boer et al. | |
| 5,717,689 A | 2/1998 | Ayanoglu | |
| 5,745,483 A | 4/1998 | Nakagawa et al. | |
| 5,774,876 A | 6/1998 | Wooley et al. | |
| 5,781,540 A | 7/1998 | Malcolm et al. | |
| 5,787,080 A | 7/1998 | Hulyalkar et al. | |
| 5,794,154 A | 8/1998 | Bar-On et al. | |
| 5,796,732 A | 8/1998 | Mazzola et al. | |
| 5,796,741 A | 8/1998 | Saito et al. | |
| 5,805,593 A | 9/1998 | Busche | |
| 5,805,842 A | 9/1998 | Nagaraj et al. | |
| 5,805,977 A | 9/1998 | Hill et al. | |
| 5,809,518 A | 9/1998 | Lee | |
| 5,822,309 A | 10/1998 | Ayanoglu et al. | |
| 5,844,905 A | 12/1998 | McKay et al. | |
| 5,845,097 A | 12/1998 | Kang et al. | |
| 5,857,084 A | 1/1999 | Klein | |
| 5,870,350 A | 2/1999 | Bertin et al. | |
| 5,877,724 A | 3/1999 | Davis | |
| 5,881,095 A | 3/1999 | Cadd | |
| 5,881,372 A | 3/1999 | Kruys | |
| 5,886,992 A | 3/1999 | Raatikainen et al. | |
| 5,896,561 A | 4/1999 | Schrader et al. | |
| 5,903,559 A | 5/1999 | Acharya et al. | |
| 5,909,651 A | 6/1999 | Chander et al. | |
| 5,936,953 A | 8/1999 | Simmons | |
| 5,943,322 A | 8/1999 | Mayer et al. | |
| 5,987,011 A | 11/1999 | Toh | |
| 5,987,033 A | 11/1999 | Boer et al. | |
| 5,991,279 A | 11/1999 | Haugli et al. | |
| 6,028,853 A | 2/2000 | Haartsen | |
| 6,029,217 A | 2/2000 | Arimilli et al. | |
| 6,034,542 A | 3/2000 | Ridgeway | |
| 6,044,062 A | 3/2000 | Brownrigg et al. | |
| 6,047,330 A | 4/2000 | Stracke, Jr. | |
| 6,052,594 A | 4/2000 | Chuang et al. | |
| 6,052,752 A | 4/2000 | Kwon | |
| 6,064,626 A | 5/2000 | Stevens | |
| 6,067,291 A | 5/2000 | Kamerman et al. | |
| 6,067,297 A | 5/2000 | Beach | |
| 6,078,566 A | 6/2000 | Kikinis | |
| 6,104,712 A | 8/2000 | Robert et al. | |
| 6,108,738 A | 8/2000 | Chambers et al. | |
| 6,115,580 A | 9/2000 | Chuprun et al. | |
| 6,122,690 A | 9/2000 | Nannetti et al. | |
| 6,130,881 A | 10/2000 | Stiller et al. | |
| 6,132,306 A | 10/2000 | Trompower | |
| 6,147,975 A | 11/2000 | Bowman-Amuah | |
| 6,163,699 A | 12/2000 | Naor et al. | |
| 6,178,337 B1 | 1/2001 | Spartz et al. | |
| 6,192,053 B1 | 2/2001 | Angelico et al. | |
| 6,192,230 B1 | 2/2001 | Van Bokhorst et al. | |
| 6,208,870 B1 | 3/2001 | Lorello et al. | |
| 6,222,463 B1 | 4/2001 | Rai | |
| 6,222,504 B1 | 4/2001 | Oby | |
| 6,223,240 B1 | 4/2001 | Odenwald et al. | |
| 6,240,294 B1 | 5/2001 | Hamilton et al. | |
| 6,246,875 B1 | 6/2001 | Seaholtz et al. | |
| 6,249,516 B1 | 6/2001 | Brownrigg et al. | |
| 6,275,707 B1 | 8/2001 | Reed et al. | |
| 6,285,892 B1 | 9/2001 | Hulyalkar | |
| 6,304,556 B1 | 10/2001 | Haas | |
| 6,327,300 B1 | 12/2001 | Souissi et al. | |
| 6,349,091 B1 | 2/2002 | Li | |
| 6,349,210 B1 | 2/2002 | Li | |
| 6,359,872 B1 | 3/2002 | Mahany et al. | |
| 6,366,568 B1 | 4/2002 | Bolgiano et al. | |
| 6,405,049 B2 | 6/2002 | Herrod et al. | |
| 6,529,824 B1 * | 3/2003 | Obradovich et al. | 701/208 |
| 6,917,968 B2 * | 7/2005 | Nakamura | 709/217 |
| 7,054,647 B2 * | 5/2006 | Inaba et al. | 455/456.1 |
| 2001/0053699 A1 | 12/2001 | McCrady et al. | |
| 2002/0013856 A1 | 1/2002 | Garcia-Luna-Aceves | |
| 2002/0090956 A1 * | 7/2002 | Otsuka et al. | 455/456 |
| 2002/0115437 A1 * | 8/2002 | Fukui et al. | 455/435 |
| 2003/0032435 A1 * | 2/2003 | Asada et al. | 455/456 |
| 2003/0037110 A1 * | 2/2003 | Yamamoto | 709/204 |
| 2003/0073447 A1 * | 4/2003 | Ogaki et al. | 455/456 |
| 2003/0134648 A1 * | 7/2003 | Reed et al. | 455/456 |
| 2003/0163251 A1 * | 8/2003 | Obradovich et al. | 701/208 |
| 2004/0198254 A1 * | 10/2004 | Mizui et al. | 455/99 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms," Jul. 2000, IEEE Journal on Selected Areas in Communications, vol. 18, No. 7.

Andras G. Valko, "Cellular IP: A New Approach to Internet Host Mobility," Jan. 1999, ACM Computer Communication Review.

Richard North, Dale Bryan and Dennis Baker, "Wireless Networked Radios: Comparison of Military, Commercial and R&D Protocols," Feb. 28-Mar. 3, 1999, 2nd Annual UCSD Conference on Wireless Communications, San Diego, CA.

Benjamin B Peterson, Chris Kmiecik, Richard Hartnett, Patrick M. Thompson, Jose Mendoza and Hung Nguyen, "Spread Spectrum Indoor Geolocation," Aug. 1998, Navigation: Journal of the Institute of Navigation, vol. 45, No. 2, Summer 1998.

Josh Broch, David A. Maltz, David B. Johnson, Yih-Chun Hu and Jorjeta Jetcheva, "A Performances Comparison of Multi-Hop Wireless Ad Hoc Network Routing Protocols," Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Self-Healing Wireless Networks," 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing In Wireless Networks Using Link-State Information".

J.J. Garcia-Luna-Aceves and Ewerton L. Madruga, "The Core-Assisted Mesh Protocol," Aug. 1999, IEEE Journal on Selected Areas in Communications, vol. 17, No. 8.

Ad Kamerman and Guido Aben, "Net Throughput with IEEE 802.11 Wireless LANs".

J. R. McChesney and R.J. Saulitis, "Optimization of an Adaptive Link Control Protocol for Multimedia Packet Radio Networks".

Ram Ramanathan and Regina Rosales-Hain, "Topology Control of Mutihop Wireless Networks Using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenya Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

SYSTEM AND METHOD FOR ANALYZING THE PRECISION OF GEO-LOCATION SERVICES IN A WIRELESS NETWORK TERMINAL

The present invention claims benefit under 35 U.S.C. § 119(e) from U.S. Provisional Patent Application Ser. No. 60/454,332 of John M. Belcea, filed on Mar. 14, 2003, the entire content of which is incorporated herein by reference.

BACKGROUND OF THE INVENTION

1. Field of the Invention

The present invention relates to a system and method for analyzing the precision of geo-location services in a wireless network. Specifically, the system and method allows network infrastructure planners to determine the best physical locations of references when identifying the geographic location of mobile terminals in a wireless network and, in particular, a wireless ad-hoc network, to achieve accuracy requirements. The system and method includes a software and hardware application that provides planners interactive visual feedback in evaluating placements that optimize geo-location coverage while minimizing infrastructure requirements.

2. Description of the Related Art

Wireless communications networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communication signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at the base node to communicate with several mobile nodes in its coverage area.

In recent years, a type of mobile communications network known as an "ad-hoc multi-hopping" network has been developed to address the needs of multiple mobile device communication beyond traditional infrastructure coverage. In this type of network, each user terminal (hereinafter "mobile node") is capable of operating as a base station or router for other mobile nodes within the network, thus eliminating the need for a fixed infrastructure of base stations. Accordingly, data packets being sent from a source mobile node to a destination mobile node are typically routed through a number of intermediate mobile nodes before reaching the destination node.

More sophisticated ad-hoc networks are also being developed which, in addition to enabling mobile nodes to communicate with each other as in conventional ad-hoc multi-hopping networks, further enable the mobile nodes to access fixed networks and communicate with other types of user terminals, such as those on the public switched telephone network (PSTN) and the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", issued on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", issued on Oct. 19, 2004, and in U.S. Pat. No. 6,873,839 entitled "Prioritized-Routing for an Ad-Hoc, Peer-to-Peer, Mobile Radio Access System", granted on Mar. 29, 2005, the entire content of each being incorporated herein by reference.

The mobile nodes of such networks may assume any number of random positions within the network, making exact node location determinations difficult at times. In either conventional wireless communications networks, or in ad-hoc wireless communications networks, it may be necessary or desirable for a mobile node to be capable of knowing or determining its geographic location. Different types of location determining services and techniques for wireless communications networks are described in a publication by Nokia which can be found on the Nokia website at "www.nokia.com/press/background/pdf/mlbs.pdf", the entire contents of which being incorporated herein by reference. Further details of location determining services and techniques for wireless communications networks are described in a Nokia White Paper entitled "Mobile Location Services", the entire content of which being incorporated herein by reference.

In particular, the Nokia document states that location identification services are currently provided in wireless communications networks based on three major technologies. One of these technologies uses cell identification combined with Round Trip Time (RTT), sometimes called Time Of Flight (TOF), Timing Advance (TA) and Measured Signal level (RX level), Time Difference of Arrival (TDOA) and Angle Of Arrival (AOA) techniques, the details of which can be appreciated by one skilled in the art. A second technology uses cellular signal timing based methods for code division multiple access (CDMA) and wideband code division multiple access (WCDMA). The third technology described in the Nokia document employs Global Positioning System (GPS) techniques.

Another list of methods and techniques currently used in the wireless communications industry for providing location services is presented in an article by DISPATCH Monthly entitled "E911 Location Technologies", the entire content of which is incorporated herein by reference. Although the GPS technique is the last technique mentioned in this list, it generally is viewed as being more accurate than all other methods listed. Further details and descriptions of GPS based methods are set forth in a publication by J. J. Spilker Jr. entitled "Satellite Constellation and Geometric Dilution of Precision" in "GPS—Theory and Applications", American Institute of Astronautics, Inc., 1996, also in a publication by P. Axelrad et al. entitled "GPS Navigation Algorithms" in "GPS—Theory and Applications", American Institute of Astronautics, Inc., 1996, also in a publication by Bradford W. Parkinson entitled "GPS Error Analysis" in "GPS—Theory and Applications", American Institute of Astronautics, 1996, and in a publication by N. Ashby et al. Entitled "Introduction to Relativistic Effects on the Global Positioning System" in "GPS—Theory and Applications", American Institute of Astronautics, 1996, the entire contents of each of these publications being incorporated herein by reference.

However, most methods and techniques described above can be improved if references used in providing location services are positioned in optimum physical or geographical locations throughout the network. Accordingly, a need exists for a system and method for assisting network infrastructure planners to determine the best physical locations of references when identifying the geographic location of mobile terminals in a wireless network.

SUMMARY OF THE INVENTION

An object of the present invention is to provide a system and method for assisting network infrastructure planners to determine the best physical locations of reference points that can be used for identifying the geographic location of mobile terminals in a wireless network.

Another object of the present invention is to provide a system and method for allowing input of terminal specifications into an application which can generate a visual feedback of position accuracy at specific points in a network map.

A further object of the present invention is to provide a system and method for allowing input of geographic parameters into an application which can generate a visual feedback of position accuracy at specific points in a network map.

Another object of the present invention is to provide a system and method for allowing storage and retrieval of previous values in an application which can generate a visual feedback of position accuracy at specific points in a network map.

These and other objects are substantially achieved by providing a system and method for presenting an interactive visual feedback, based upon input parameters, indicating quality levels in terminal location detection in a network at selectable points on a map. The system and method includes an application in which a user provides information regarding network terminals, terminal locations, and mapping parameters. In response, the application provides a visual indication of expected accuracy in geo-location calculations for terminals at specific points in a network map.

Specifically, these and other objects are substantially achieved by providing a system and method for determining desired physical locations of reference points for use in identifying geographic locations of mobile terminals in a wireless network, such as an ad-hoc peer-to-peer wireless network. The system and method perform the operations of inputting information pertaining to a plurality of reference terminals in the wireless network, the information including respective location information for each of the reference terminals, and generating, based on the input information, a visual display illustrating the locations of the reference terminals, along with a visual indication representing expected accuracy in geo-location calculations for determining respective geographic locations of the mobile terminals in the network. The reference terminals and the mobile terminals can be fixed and mobile nodes, respectively, in an ad-hoc peer-to-peer wireless network. The input information can include map parameters, and the operation generates the visual display which includes a map display that is generated based on the map parameters with the respective locations of the reference terminals and the visual indication of expected accuracy being included on the map display.

The information can also include respective longitude, latitude and altitude information of each of the respective reference terminals, and the visual display of the locations of the reference terminals is generated based on the longitude, latitude and altitude information. Furthermore, the information can include signal propagation information indicating respective maximum distances at which signals emitted from the respective reference terminals can propagate, and the visual indication representing the expected accuracy in geo-location calculations is generated based on the signal propagation information. Additionally, the system and method can modify the input information pertaining to at least one of the reference terminals, and modify the visual display and visual indication based on the modified input information.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

The embodiment of the present invention described below implements a "Geo-Location" analysis system and method using any number of terminal devices, such as the MEA™ terminal produced by MeshNetworks, Inc. Such terminals can include computer hardware and operating software for wireless broadband applications that provide voice, data, streaming media, and geo-location to users of personal computers and wireless communication devices such as personal digital assistants and cellular telephones. The system and method includes an application which presents an interactive visual feedback, based upon input parameters, indicating quality levels in terminal location detection in a network at selectable points on a map.

This system and method allows network infrastructure planners to determine the best physical locations for wireless references in order to meet requirements for geo-location accuracy. The system and method also give planners interactive visual feedback in evaluating placements that will optimize geo-location coverage while minimizing infrastructure requirements. The embodiment presented below can be run in any compatible Microsoft Windows® operating system, such as those released after 1995, however, the embodiment can be adapted to perform on suitable alternate systems as can be appreciated by one skilled in the art.

Figure 1:
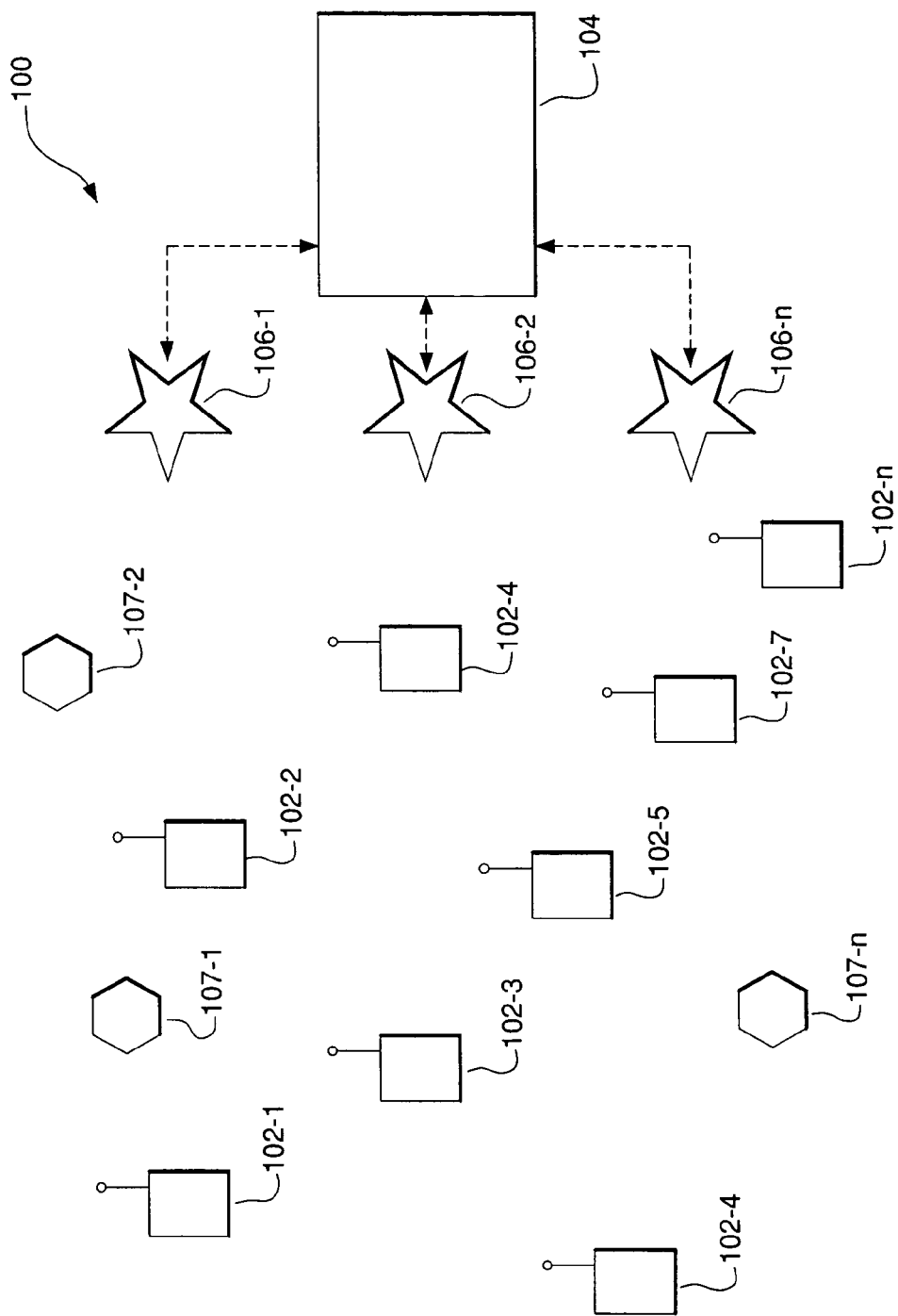
FIG. 1 is a block diagram of an example of an ad-hoc wireless communications network including a plurality of nodes employing an embodiment of the present invention.

An illustrative network upon which the embodiment of the present invention can be implemented is shown in FIG. 1. FIG. 1 is a block diagram illustrating an example of a multi-hopping ad-hoc packet-switched wireless communications network 100 employing an embodiment of the present invention. Specifically, the network 100 includes a plurality of mobile wireless user terminals 102-1 through 102-n (referred to generally as nodes 102, or mobile nodes 102), and can, but is not required to, include a fixed land network 104 having a plurality of access points 106-1, 106-2, . . . 106-n (referred to generally as nodes 106 or access points 106), for providing subscriber devices 102 with access to the fixed network 104. The fixed network 104 can include, for example, a core local access network (LAN), and a plurality of servers and gateway routers, to provide network nodes with access to other networks, such as other ad-hoc networks, the public switched telephone network (PSTN) and the Internet. The network 100 further includes a plurality of fixed routers 107-1 through 107-n (referred to generally as nodes 107, fixed routers 107, or wireless routers 107) for routing data packets between other nodes 102, 106 or 107. Those fixed wireless routers are required in cases when the density of mobile terminals has periodic oscillations due to mobile node migrations. It is the case of large cities where mobile terminals migrate downtown in the morning when a large number when people go to work, and spread to suburbs in the evening when these people return home. For assuring the communication downtown during the nigh and in early hours of thee morning when the number of subscriber is very small, a fixed infrastructure of wireless routers has to be deployed downtown. Because wireless routers 107 are not mobile, they are preferred for use as reference nodes for mobile node position measurements. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. No. 5,943,322 to Mayor, which is incorporated herein by reference, and in U.S. Pat. Nos. 7,072,650, 6,807,165, and 6,873,839 which are referenced above.

Figure 2:
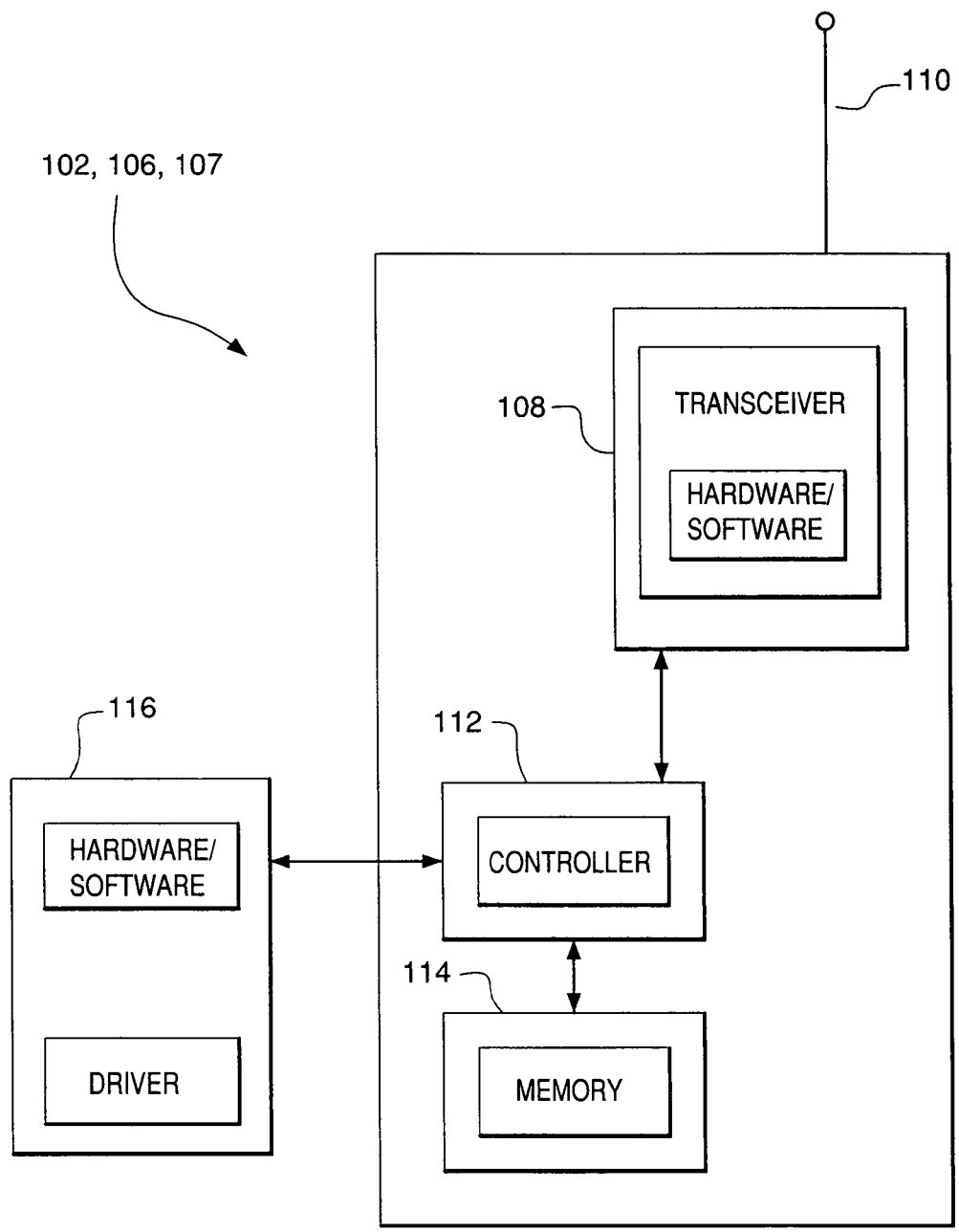
FIG. 2 is a block diagram of an example of a wireless node, or subscriber device, as shown in FIG. 1.

As shown in FIG. 2, each node 102, 106 and 107 has a transceiver including a transmitter and a receiver, which collectively can be referred to as a modem 108. As shown in FIG. 2, each node 102, 106 and 107 includes a modern 108 which is coupled to an antenna 110 and is capable of receiving and transmitting signals, such as packetized signals, to and from other nodes 102, 106 and 107, under the control of a controller 112. The packetized data signals can include, for example, voice, data or multimedia information, and packetized control signals, including node update information.

Each node 102, 106 and 107 further includes a memory 114, such as a random access memory (RAM), that is capable of storing, among other things, routing information pertaining to itself and other nodes in the network 100. The nodes 102, 106 and 107 exchange their respective routing information, referred to as routing advertisements or routing table information, with each other via a broadcasting mechanism periodically, for example, when a new node enters the network 100, or when existing nodes in the network 100 move.

As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

As noted above, network infrastructure planners typically attempt to determine the best physical locations for wireless references in order to meet requirements for geo-location accuracy. To do so, the embodiment described below includes an application, or set of computer-readable instructions, which provide the planner with interactive visual feedback for evaluating placements that will optimize geo-location coverage while minimizing infrastructure requirements.

To install the application, the planner simply copies the file NGLAT.EXE provided by the computer-readable instructions of the system and method into any folder on a personal computer (PC) or similar device, which can be the host 116 as shown in FIG. 2 or a different computer or device. To run, or execute the application, the planner simply double-clicks on the NGLAT.EXE file icon in the Microsoft Windows® file manager, or uses WINDOWS functions to create an icon on the desktop, and put it into the Start Menu or onto a quick-launch bar. While it runs, the application creates and maintains a NGLAT.INI file in the WINDOWS folder. The file contains the configuration settings that will be used next time when the application is started.

Figure 3:
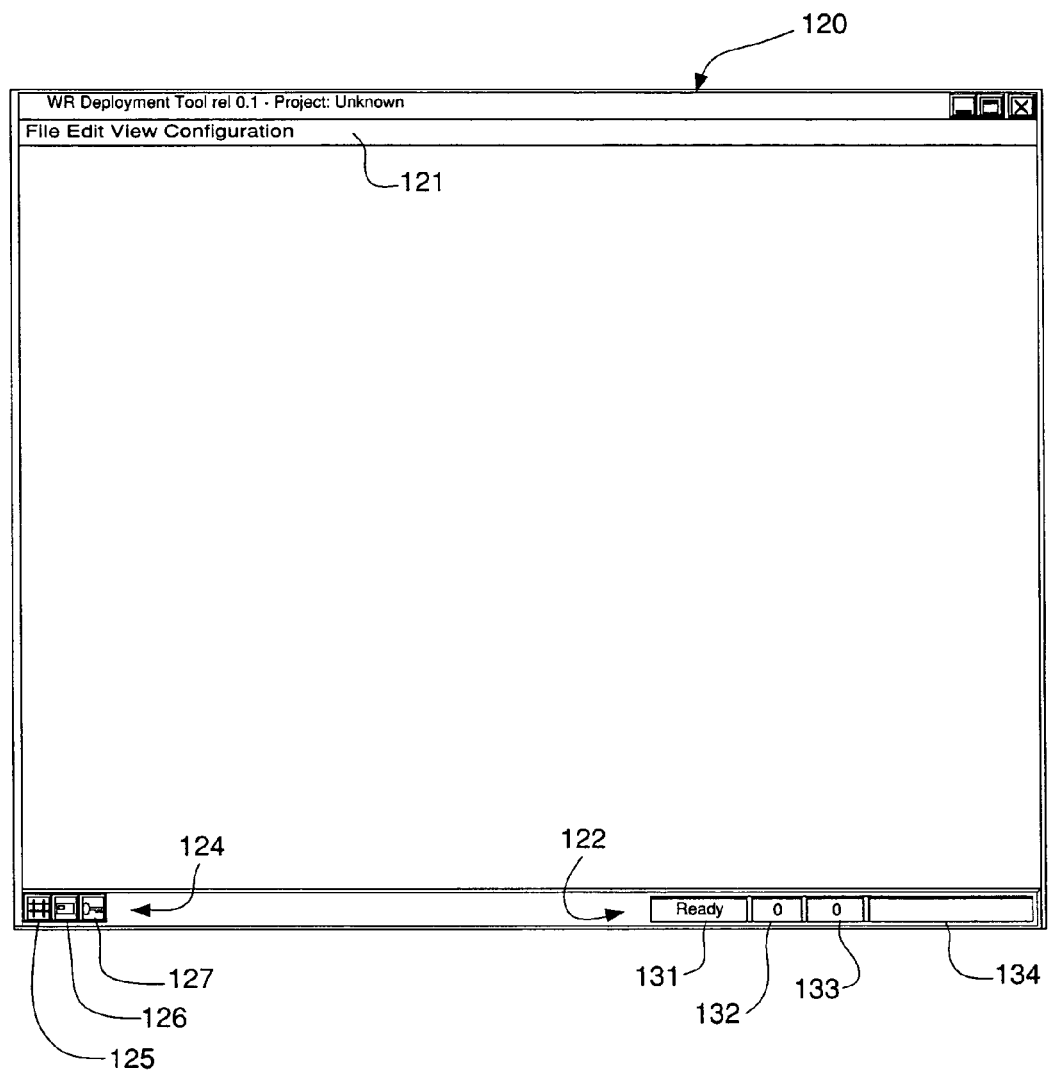
FIG. 3 is an example illustrating a main window in accordance with an embodiment of the present invention.

When the NGLAT is first started, the application presents an empty main window 120 with a menu bar 121 located at the top, status bar 122 and tool bar 124 located at the bottom as shown in FIG. 3. A set of quick operation buttons 125, 126 and 127, and the status of the application are also located on the bottom of the window 120.

In this example, the menu of the application has four entries: File, Edit, View and Configuration. Each entry is described in greater detail below.

The first entry of the application menu is the "File" entry, noted below. This allows entry of information regarding new projects, routers, loading projects, opening projects, importing router data, importing street map data, and saving projects.

File->New->Project: The File menu entry New Project is used to create new empty projects. A new project does not have any wireless router (WR) or street information. Such information is provided via a dialog box.

Figure 4:
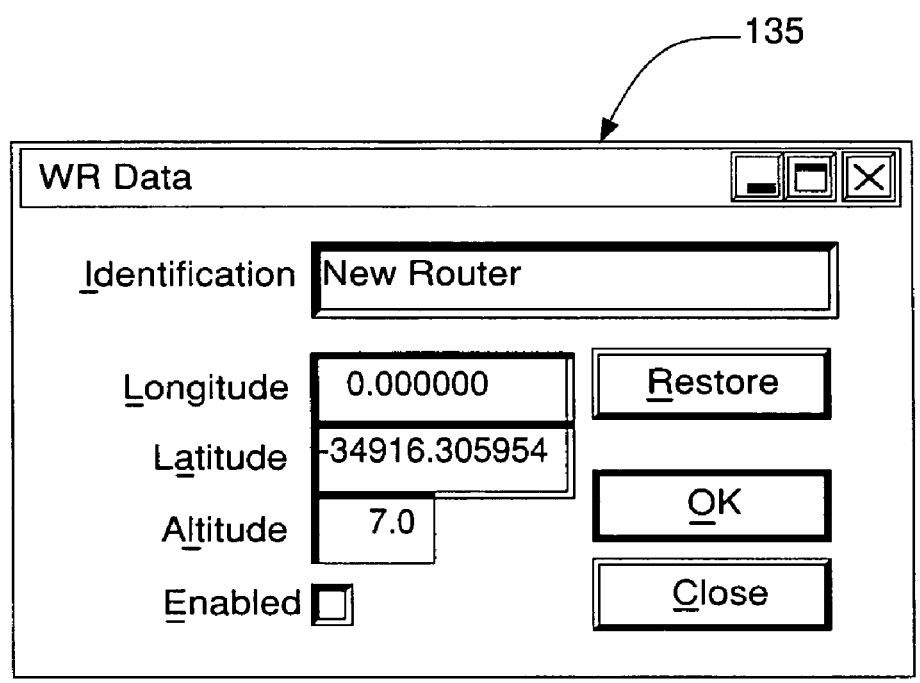
FIG. 4 is an example illustrating a WR data dialog box in accordance with an embodiment of the present invention.

File->New->Router: The File menu entry New->Router is used to enter router data. When this entry is selected, a "WR data" dialog box pops up, and a new router is created as shown in FIG. 4. FIG. 4 illustrates an example of a WR data dialog box 135 in accordance with an embodiment of the present invention, allowing data for a new router (e.g., a router 107 as shown in FIG. 1) to be included in the application. Router coordinates are initially set at the current location and assumed to be at 7-meters in elevation, for example, but can be at any suitable height. The default name of the new router is "New Router". The new router is initially disabled, that is, the "Enabled" box of the WR data dialog box is not checked. In physical operation it corresponds to having the device turned off. The "WR data" dialog box shows initially these defaults, and can be changed at any time. The first thing the planner has to do is to change the name from New Router to something else, as using the same name for more than one router, may become confusing. Entering new coordinates and elevation will move the router in a new position. Checking the Enabled box turns on the router, which starts participating in network.

Figure 5:
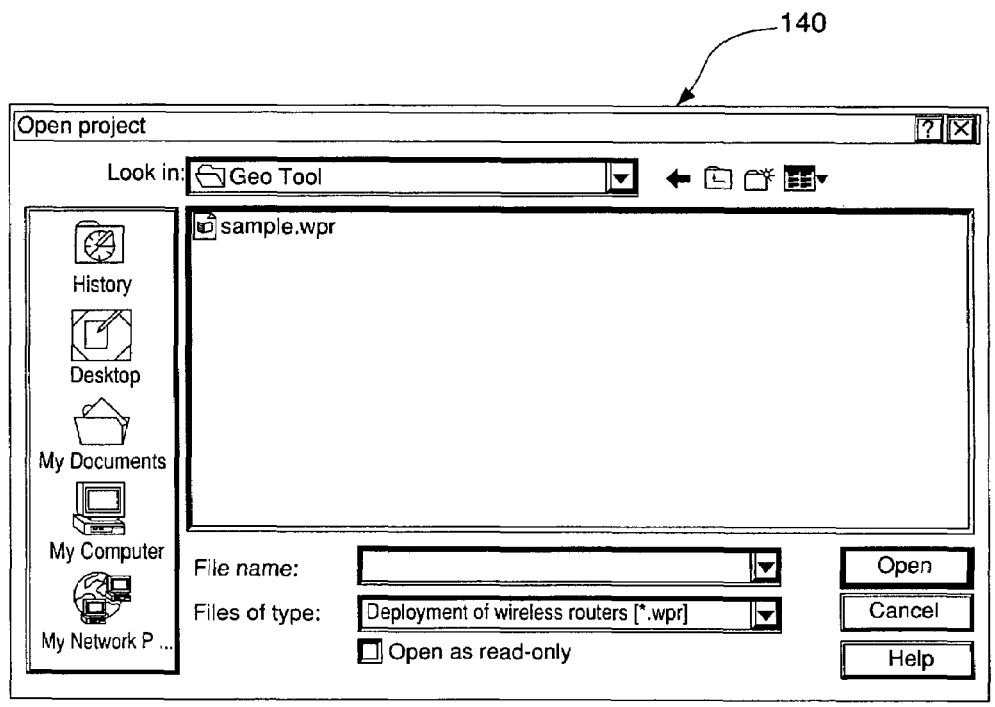
FIG. 5 is an example illustrating an open project window in accordance with an embodiment of the present invention.

File->Load Project: The File menu entry Load Project is used to load an existing project. The planner can use this entry to load an existing project as shown in FIG. 5. FIG. 5 illustrates an example of an open project window in accordance with an embodiment of the present invention. If the planner has made changes to the currently active project, the application provides a dialog box asking if the user wants to save the current work. The "Open project" dialog box 140 is then opened to select a project file from the local drive or from LAN.

Figure 6:
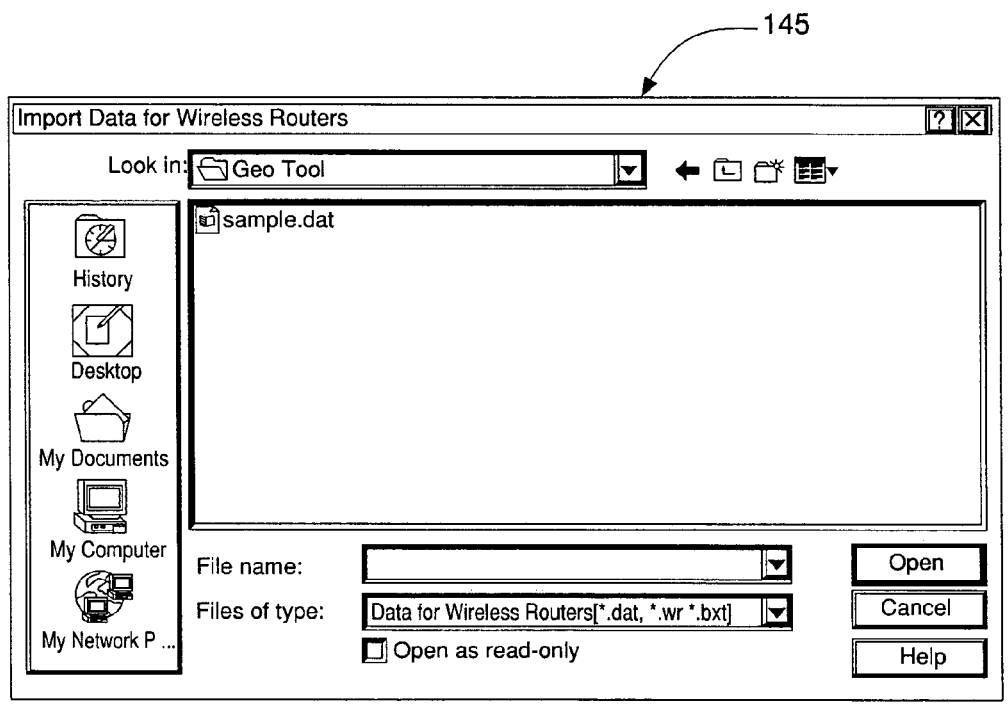
FIG. 6 is an example illustrating an import router data window in accordance with an embodiment of the present invention.

File->Import Router Data: The File menu entry Import Router Data is used to add router data to the current project. When the menu entry is selected, the dialog box "Import Data for Wireless Routers" 145 is displayed as shown in FIG. 6. FIG. 6 illustrates an example of an import router data window in accordance with an embodiment of the present invention. Files of information about routers are text files with one-line router definitions. A router definition has four fields, in the following order: longitude, latitude, height or elevation, and description (name), as shown in the example below. The description should be less than 32 characters. The fields are separated by at least one space or tab character, a format output common for many software tools. Lines beginning with "#" and blank lines are comments and are ignored when router data is imported.

| # lon | lat | height(m) | description |
|---|---|---|---|
| −81.36398 | 28.62299 | 7 | 6043735 Antonio's restaurant |

Clicking on the "Open" button of the Import Router Data window 145 of FIG. 6 will import data about routers from the selected file. Imported data is added to already existing routers.

Figure 7:
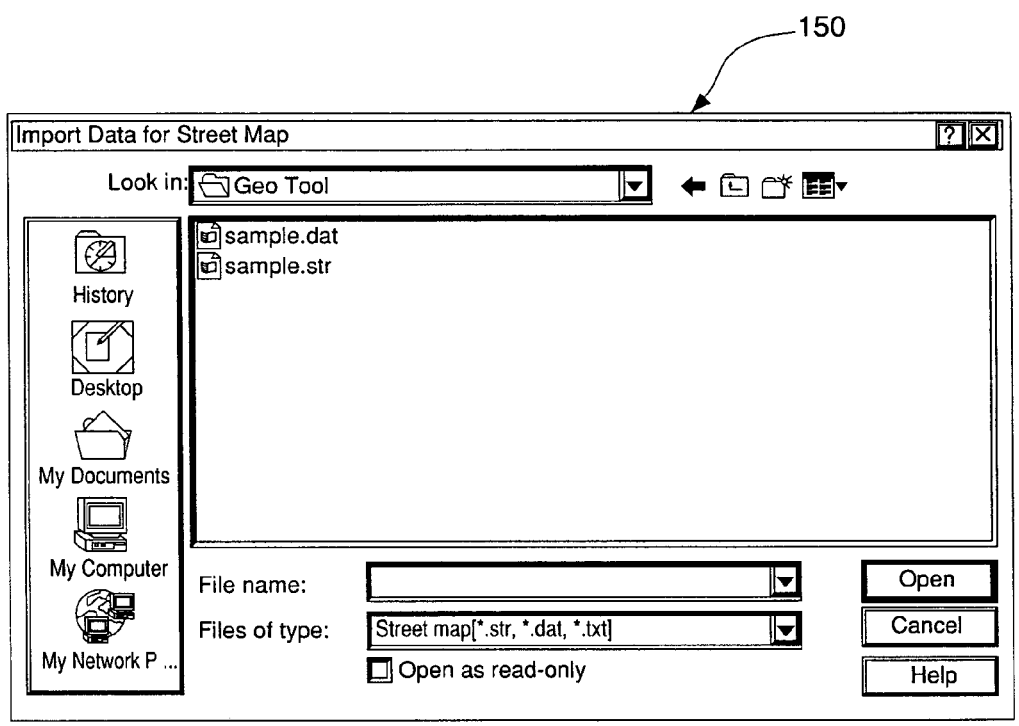
FIG. 7 is an example illustrating an import street map data window in accordance with an embodiment of the present invention.

File->Import Street Map: The File menu entry Import Street Map data is used to import data about streets in planning area as shown in FIG. 7. FIG. 7 illustrates an example of an import street map data window 150 in accordance with an embodiment of the present invention. The street map is displayed in top of the quality map allowing planner orientation. Also, a street map may be imported to speed up the computation process when the quality of the geo-location is important only on streets, and not within blocks between streets.

Each line in the Street Map file contains the description of a street, as shown in the example below. The fields, which must be in the following order, are the geographical coordinates of both ends of the street, the street width, and a description of 32 characters or less. The fields are separated by at least one space or tab character, as above, a format readily output by most software tools. Lines beginning with "#" and blank lines are ignored.

| # | | | STREET LIST | | | |
|---|---|---|---|---|---|---|
| # | from | | to | | | |
| #lon | lat | | lon | lat | width | Description |
| −81.3655 | 28.637 | | −81.3655 | 28.600 | 40 | Maitland Ave & US Hwy 17 |

File->Save Project: The File menu entry Save Project is used to save the current project to a file. The name of a loaded or saved project is displayed in the title bar of the main window of FIG. 3. A new project, created with "New Project" menu entry, does not have a name. If the project does not have a name yet, "Unknown" is displayed in the window title bar. If any change has been made to the project since it was last saved, the name of the project in main window title bar is followed by an asterisk. After the project is saved, the asterisk is removed from the title bar. If the planner tries to save an "Unknown" project, the tool activates the file naming dialog box, which can be referred to as the save project data window 155 shown in FIG. 8.

Figure 8:
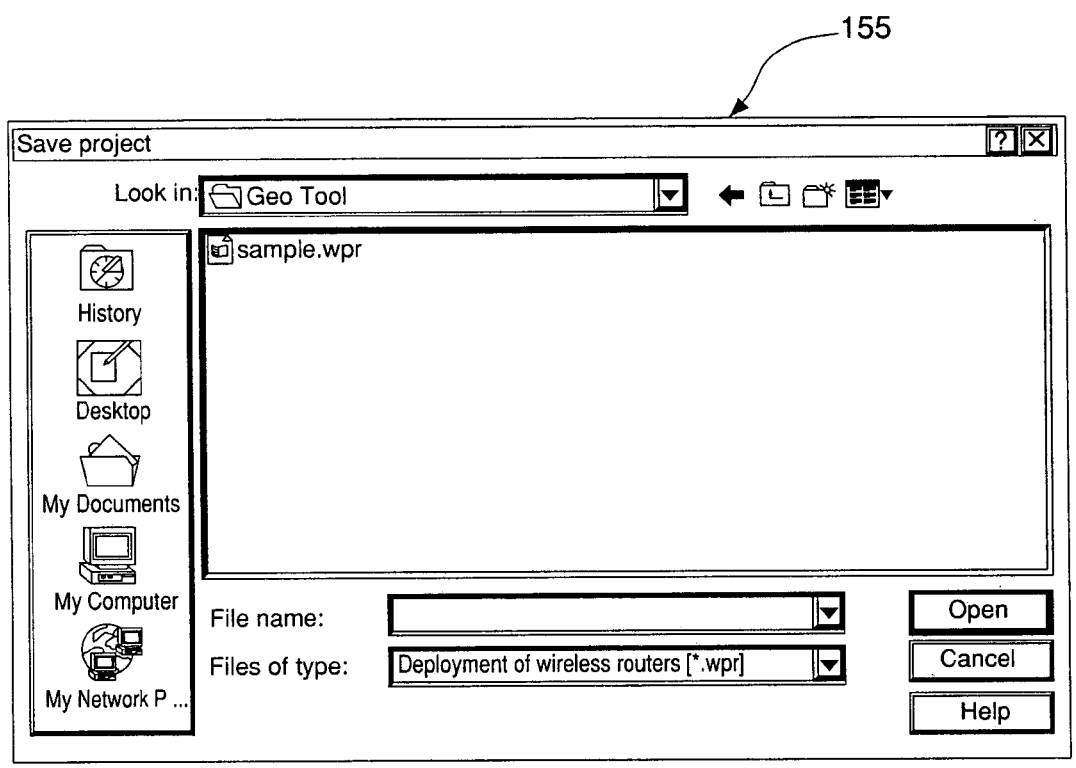
FIG. 8 is an example illustrating a save project data window in accordance with an embodiment of the present invention.

File->Save Project As . . . : The file menu entry is used to set or change the name of a project as shown in FIG. 8. FIG. 8 illustrates an example of a Save Project Data window 155 in accordance with an embodiment of the present invention. The planner first types in the name of the project in the File Name text box and then clicks the "Save" button shown in FIG. 8.

The second entry of the application menu is the "Edit" entry, noted below. This allows manipulation of information either through copying or deleting.

Edit->Copy: The Edit menu entry Copy is used to copy a project image from the screen to Windows clipboard in the device independent bitmap (DIB) format. From the clipboard, the picture can then be imported in a document, presentation, and so on.

Edit->Delete Router: The Edit menu entry Delete Router is used to remove the currently selected router. To select a router, click on the router sign. The WR Data dialog box 135 of FIG. 4 is opened showing the information about the currently selected wireless router.

The third entry of the application menu is the "View" entry, noted below. This allows viewing of various information.

View->Labels: The View menu entry Labels is used to control the display of router labels (descriptions). With this menu entry, the view of the router labels can be turned On and Off. The same effect can be achieved by pressing the label  button 126 in the tool bar 124 of the main window shown in FIG. 3. If the project contains a large number of routers, router labels may overlap each other clogging the view. In such case hiding the router labels clears the picture.

View->Grid: The View menu entry Grid is used to view or hide the geographic grid. The same effect can be achieved by pressing the grid ⊞button 125 in the tool bar 124 of the main window 120 shown in FIG. 3.

View->Legend: The View menu entry Legend is used for displaying the legend window. The legend window can also be displayed by pressing the legend ⊞button 127 in the tool bar 124 of the main window 120 shown in FIG. 3.

Figure 9:
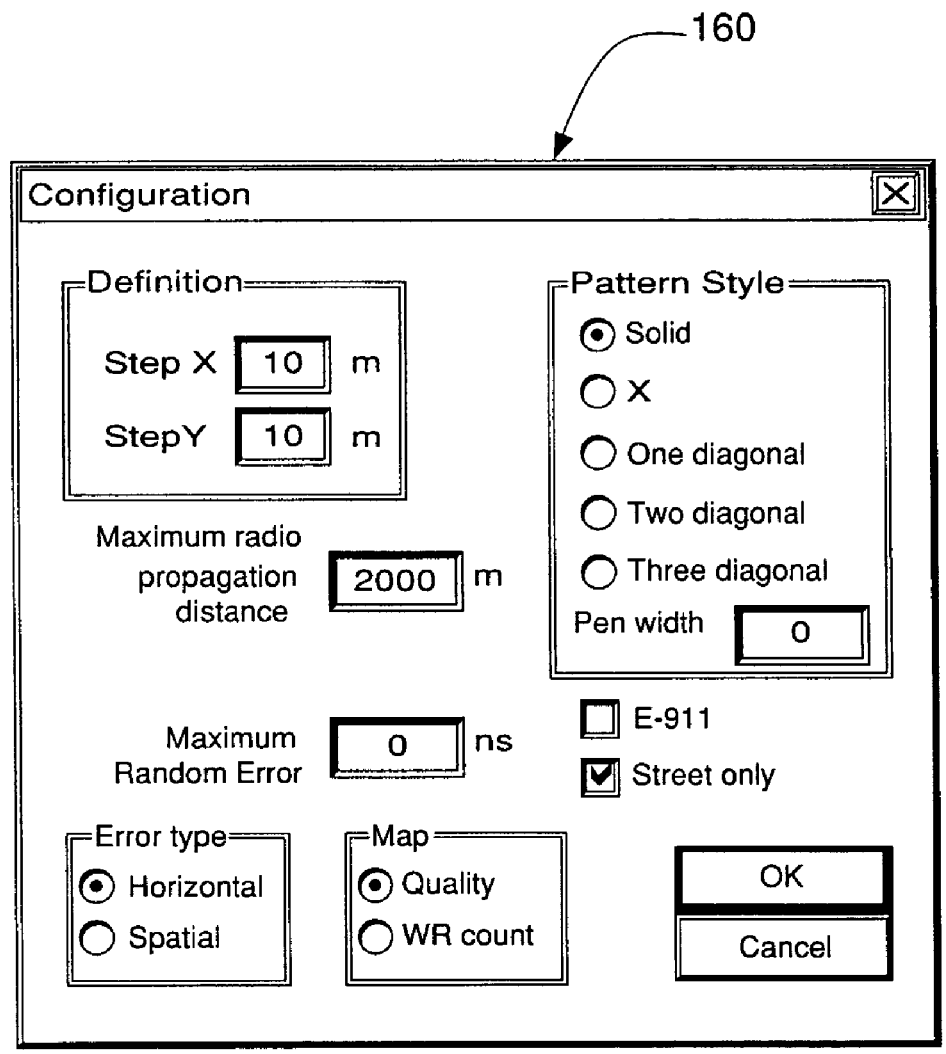
FIG. 9 is an example illustrating a configuration dialog box in accordance with an embodiment of the present invention.

The fourth entry of the application menu is the "Configuration" entry, noted below. The Configuration menu entry is used to display the configuration dialog box 160, where the planner can enter the system configuration data as shown in FIG. 9.

Configuration: Definition: The Configuration menu entry Definition is used to specify the step size used to scan the geographical area in calculating geo-location coverage. In each step, the software of the application will compute the distance between the true position and the position provided by the Location Algorithm. Additional details of a Location Algorithm are discussed in U.S. patent application Ser. No. 09/988,001 entitled "A System And Method For Computing The Location Of A Mobile Terminal In A Wireless Communications Network", filed on Nov. 16, 2001, the entire content of which is incorporated herein by reference. The difference between these two positions is the calculation error, and is plotted in a specific color as a rectangle.

Configuration: Step X: The Configuration menu entry Step X is used to set the definition on the East-West (OX) direction.

Configuration: Step Y: The Configuration menu entry Step Y is used to set the definition on the North-South (OY) direction.

Configuration: Pattern Style: The Configuration menu entry Pattern Style is used select a color indication profile. The rectangle described above can be filled with the color corresponding to the expected calculation error using different weight patterns. The solid pattern covers the scanning rectangle completely and is 100% opaque. Other patterns provide various levels of transparency, depending on the size of the scanning rectangle.

Configuration: Maximum Propagation Distance: The Configuration menu entry Maximum Propagation Distance is used to set the limits of communication for GEOSERVICES purposes. Because geo-location requires a communication link with reliability not smaller than 10%, the propagation distance for this service is much larger than the propagation distance for data transfer, which requires at least 90% link reliability.

Configuration: Maximum Random Error: As known to those skilled in the art, the Time of Flight (TOF) is affected by random errors. The Configuration menu entry Maximum Random Error sets the maximum error that can affect the TOF. For computing the precision of the location in a specific point, the algorithm computes the true distances from the point to all references, and converts them to true TOF (nanoseconds). The TOFs are then affected by random errors smaller, in absolute value, than the value specified in this entry. The TOFs affected by random errors are then used in the Location Algorithm for computing the location of the specific point.

The random errors that are added to the TOF should reflect the radio propagation conditions in the studied area. Outside buildings, when line of sight is possible, the random errors can be from 30 ns to 50 ns, while inside buildings and in city "canyons" where radio propagation is affected by a large number of reflections, these values can be from 100 ns to 150 ns. The maximum value of these random errors is also dependent on the method used for measuring the TOF. For different methods of measuring TOF, the maximum size of the random errors may be selected as either a smaller or larger value.

Configuration: E-911: The error map can be drawn with high or low precision. The Configuration dialog box includes an E-911 checkbox that allows for this in alternate error ranges. If this box is checked, the map shows errors from at or about 0 to at or about 250 m, which makes it easy to identify if E-911 requirements are met. If this box is not checked, the map shows errors between at or about 0 m to at or about 25 m.

Configuration: Street Only: The Configuration menu entry also includes a Street Only checkbox. This check box is available only if the project contains street data. When it is checked, the location errors are computed only for street area. It allows the computation to be performed only for street area which takes shorter time.

Configuration: Error Type: The Configuration menu entry Error Type is used to control displayed error. The displayed error can be the distance between the true point and computed point in two-dimensional (horizontal) or in three-dimensional space. When the Horizontal button is checked, the map shows the distance between the true position and the computed position in the horizontal plane. When the Spatial button is checked, the map shows the distance between the true position and the computed position in three-dimensional space.

Configuration: Map: The Configuration menu entry Map is used to show the map of errors or the number of routers that can be received in any scanned point. When the Quality button is checked, the map shows the distances in scanned area. When the WR Count button is checked, the map shows the number of routers that can be received in any point of the scanned area, according with the Maximum Propagation Distance.

Configuration: OK Button: The Configuration menu entry OK button is used to change the configuration values. While the Configuration dialog box 160 of FIG. 9 is open, the computation of the application is stopped. Clicking the OK button will change the configuration according to actual settings and will close the dialog box. If any of the configuration settings were changed, the computation starts from the beginning.

Configuration: Cancel Button: The Configuration menu entry Cancel button is used to close the dialog box without updating any configuration elements.

Returning to FIG. 3, the application includes a tool bar 124. The tool bar includes at least three buttons. The first button ⊞125 can be used to control the display of the map grid. The second button ▪126 can be used for controlling the display of the WR labels. The third button ⊞127 launches the Legend window.

The application also includes a status bar 122 on the lower right-hand side of the window that shows four boxes of information about the computation status or the current action, the element being computed, the percent completed, and a progress bar that tracks completion, 131, 132, 133, and 134 respectively.

The computation status box 131 can show Computing, Patching, or Ready. The "Computing" indicator is displayed when the application program computes data for the whole map. Enabling or disabling a WR, causes computation of a "patch" including the WR and covering an area up to the propagation distance. The "Patching" text is displayed in the status box 131 when the program computes a patch of the map. When the computation is completed, the status box 131 shows "Ready".

The second box 132 shows the element that is being computed. When the program computes the whole map, this indicator shows "Main" in box 132. When the program computes a patch, the program shows the number of the patch that is currently being computed.

The third indicator box 133 shows the percentage completed by the currently executing computation. The last indicator box 134 is a progress bar showing the level of completion of the currently executing computation.

Figure 10:
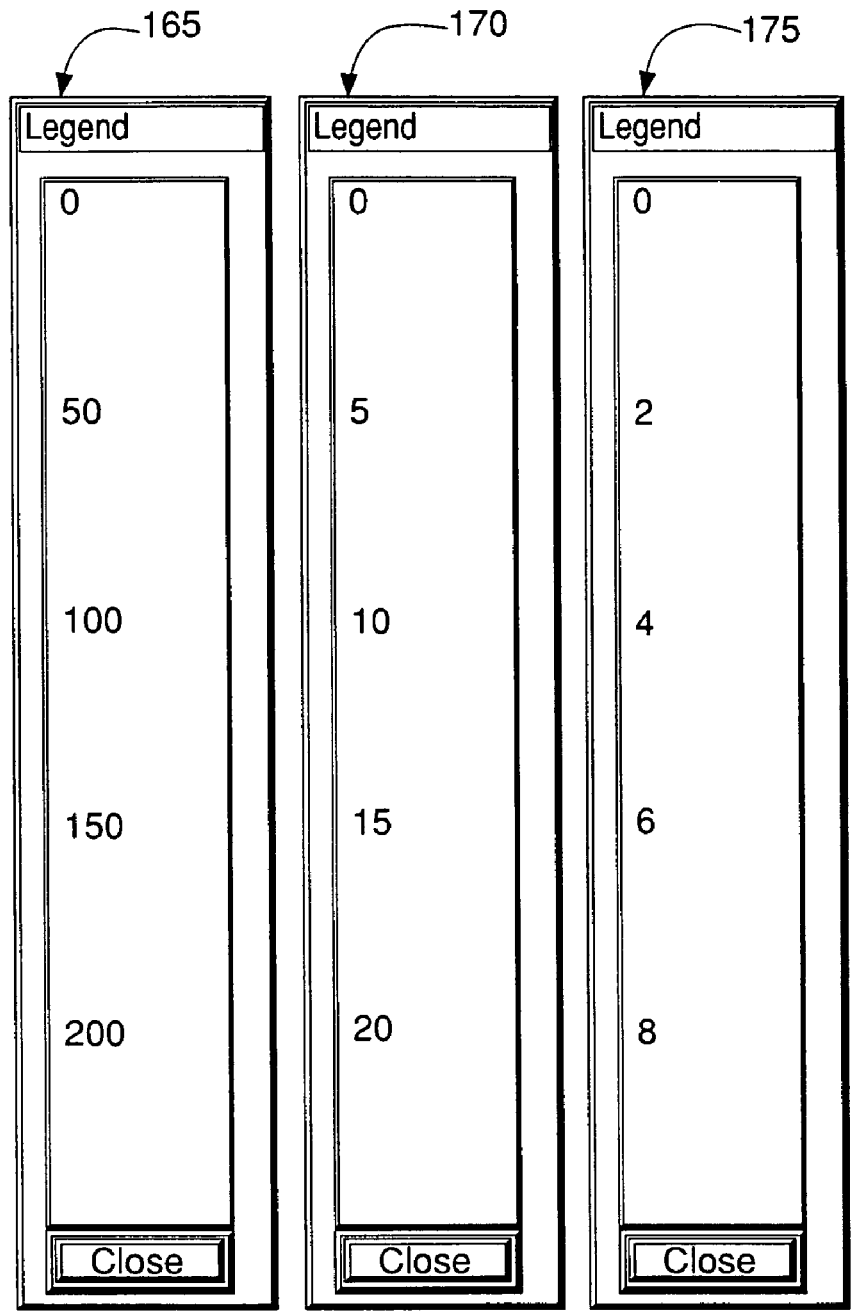
FIG. 10 is an example illustrating a legend window in accordance with an embodiment of the present invention.

The scale of the Legend window shown in FIG. 10 depends on map type. FIG. 10 is an example illustrating a legend window in accordance with an embodiment of the present invention. The legend 165 for maps of location quality with E-911 flag turned on shows distances up to at or about 250 m. The legend 170 for maps of location quality with E-911 flag turned off shows distances up to at or about 25 m. The legend 175 for WR count maps shows values up to at or about 10 counts. In all cases, values equal to or larger than the maximum value are presented in a red color. The scales of legends 165, 170, and 175 have a top and bottom respectively, with a top colored green, below which light green, and below which yellow, and below which blue, and below which at the bottom, red. Therefore values equal to or larger than the maximum value presented in a red color are at or near the bottom of each legend 165, 170, and 175, respectively. The color scale of the legends will become more apparent when considered in use with FIGS. 13 and 16 below.

Figure 11:
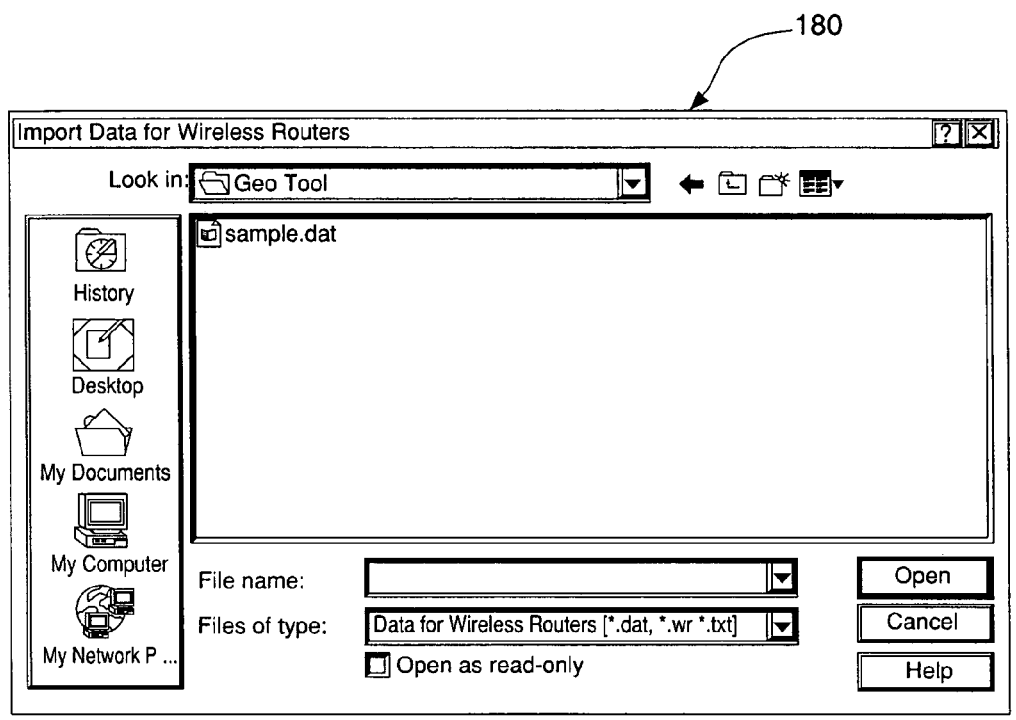
FIG. 11 is an example illustrating an import WR data window in accordance with an embodiment of the present invention.

The embodiment of the present invention described above also includes a set of files that can be used for instructing a user of the application, as described in greater detail below. When starting the application, the screen is blank because no data is available. To create the first project, the user can import WR data from a provided Sample.dat file by clicking on File→Import router data, then choosing the file Sample.dat containing WR data as shown in FIG. 11. FIG. 11 is an example illustrating an import WR data window 180 in accordance with an embodiment of the present invention.

Figure 13:
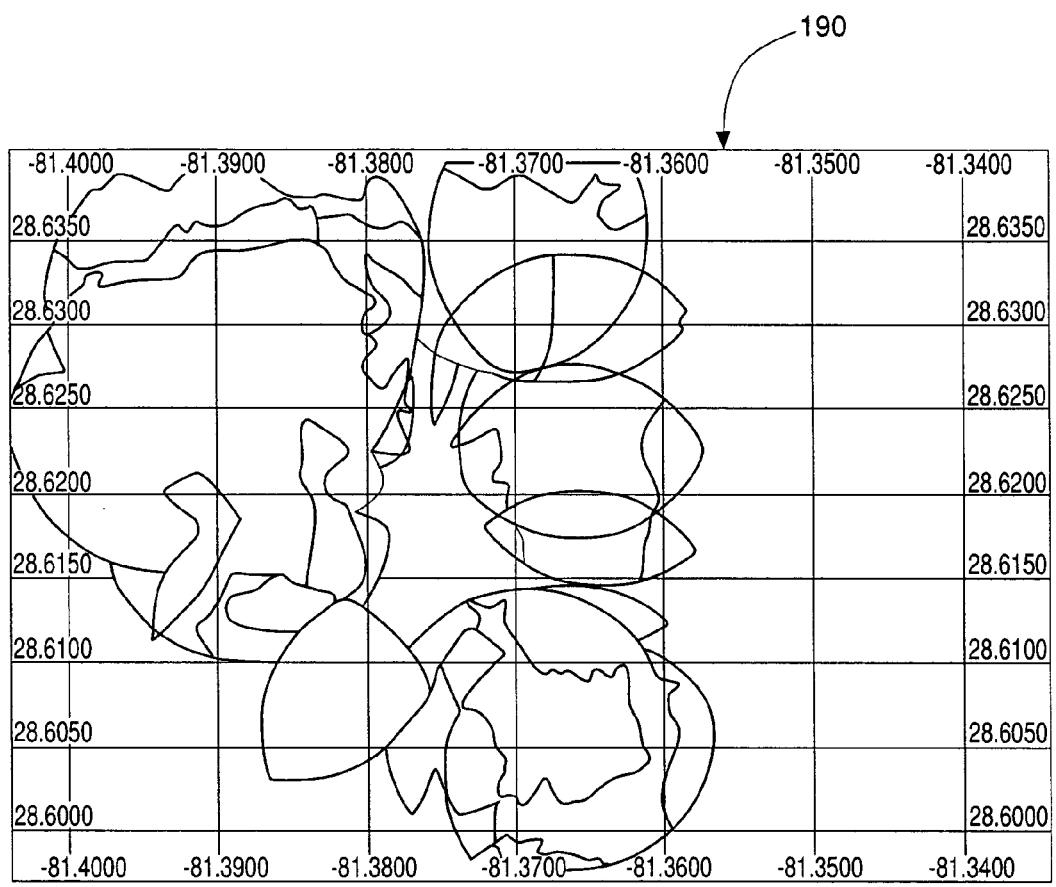
FIG. 13 is an example illustrating a precision map of an area in accordance with an embodiment of the present invention.

After reading the WR description file, NGLAT shows the routers and the geographic grid and starts automatically computing the precision map. Once the computation is completed, the main window shows the map presented in FIG. 13. FIG. 13 is an example illustrating a precision map 190 of an area in accordance with an embodiment of the present invention. The user can change configuration parameters during the computation of the map. If the change affects the way the map is displayed, the map computation will start automatically from the beginning. Resizing the NGLAT window should also automatically restart the map computation.

Figure 12:
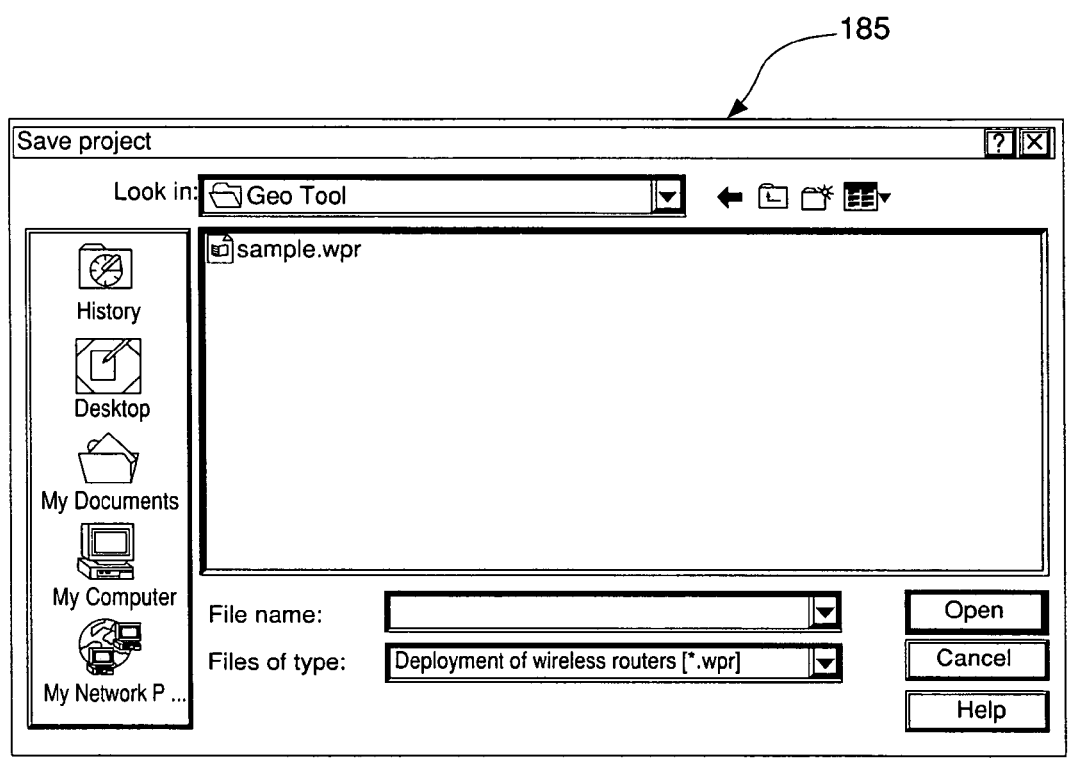
FIG. 12 is an example illustrating a save project data window in accordance with an embodiment of the present invention.

The window title bar shows the release number of WR deployment tool and the project name. If the current project was modified, an asterisk is displayed next to the project name. The user can then chose Save or Save As to save the project as shown in FIG. 12. FIG. 12 is an example illustrating a Save Project data window 185 in accordance with an embodiment of the present invention.

Figure 14:
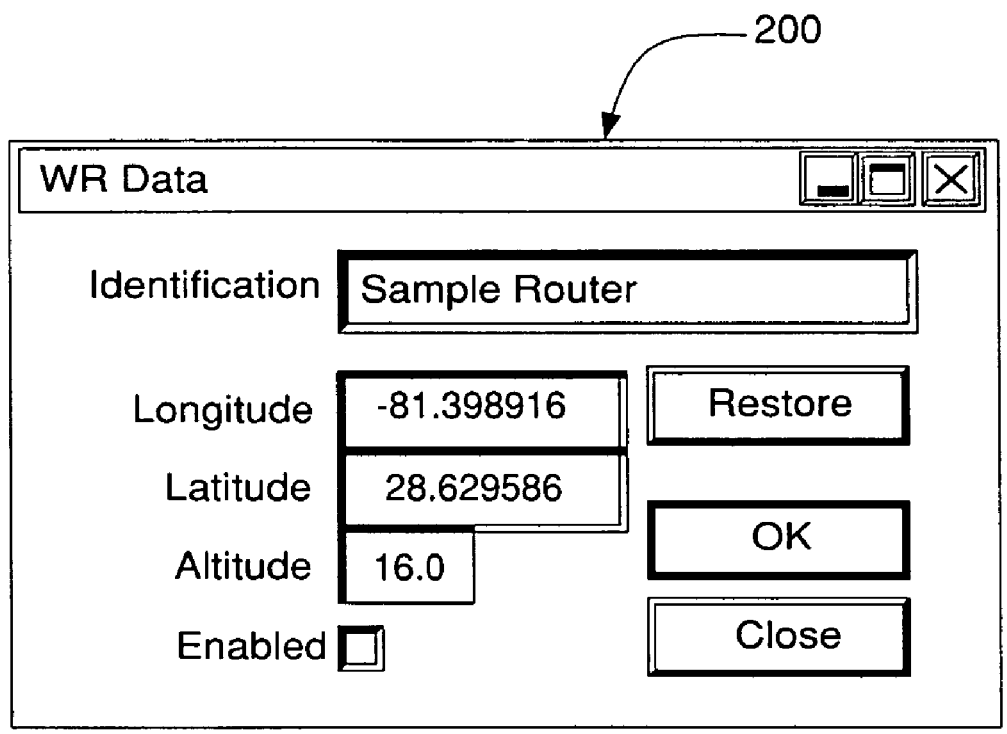
FIG. 14 is an example illustrating a WR information dialog box in accordance with an embodiment of the present invention.

The user can then enter the name of the project, without a file extension. After clicking on the Save button, the project is created and the name of the project is displayed on the window title bar without the asterisk. Clicking the left mouse button on any WR displays WR information box 200 as shown in FIG. 14.

When the user clicks on a WR symbol on the map, the WR information box pops up. All fields in the WR information dialog box can be edited by the user. The user can change the WR identification, longitude, latitude, and altitude, and also enable or disable the WR.

Double-clicking on a WR causes it to toggle between enabled and disabled. Data about WR that was modified with the information box is saved with the project. The Restore button can be used to return the Longitude, Latitude, and Altitude data back to the original values read from the router data file.

Every time the user enables/disables a WR, the new precision map is automatically computed. To save time, the tool computes only a "patch" to the old map for each WR that changes status, not the whole precision map of FIG. 13. Additionally, a project that has been saved can be loaded back at anytime. The application provides protection against the loss of unsaved data.

The map in FIG. 13 shows the precision of location when the router on the Pinnacle Tower is disabled. The Legend of the map precision of FIG. 13 is displayed by clicking on the Legend button 127 on the status bar 124, or by selecting the Legend button using View→Legend from the main menu.

If the coordinates of a WR are changed when the WR is enabled, the whole map is automatically recomputed. To save time it is preferable to disable the WR and move it in a new position, then enable it again. This way the application will compute two patches, instead of the whole map.

Figure 15:
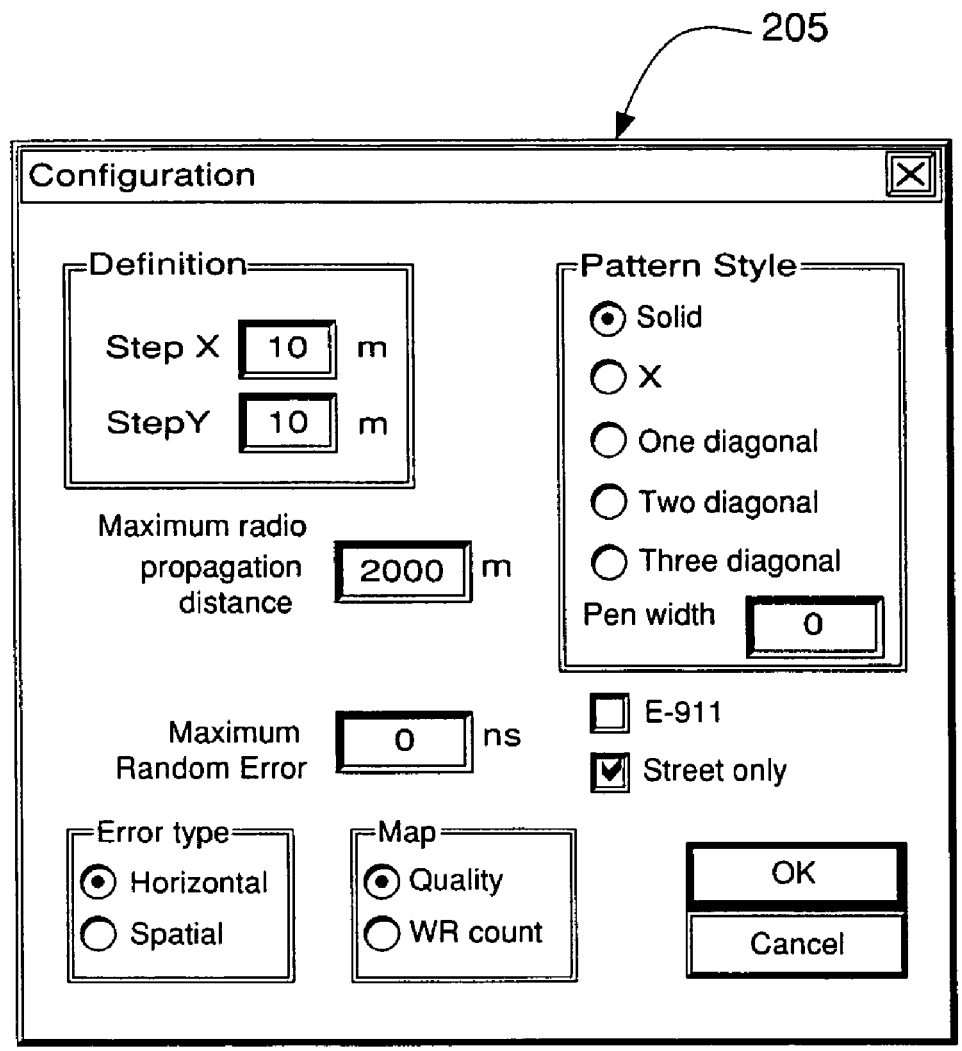
FIG. 15 is an example illustrating a particular configuration dialog box in accordance with an embodiment of the present invention.
Figure 16:
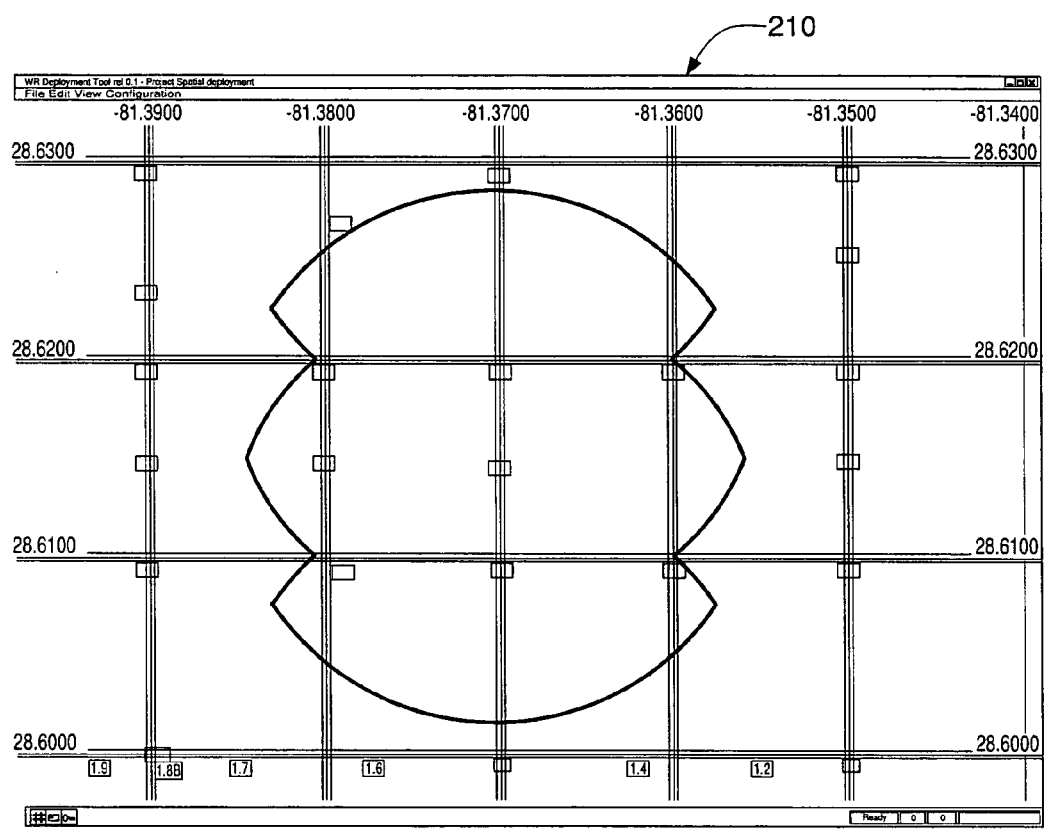
FIG. 16 is an example illustrating a location quality map in accordance with an embodiment of the present invention.

A specific example in which the embodiment of the present invention described above is used, as in a particular configuration, is described below with reference to FIGS. 15 and 16. The example project entitled "Street Deployment" shows a case in which coverage is to include only the streets of an area, and not the blocks between streets. In the example of FIG. 16, there is a section of a city with 4 avenues on an east-west direction, avenues A, B, C, and I, and 5 streets on a north-south direction, streets 1, 2, 3, 4 and 5. Therefore, intersections can be defined by the letter of the avenue and the number of the street, i.e. A2 would be the intersection of avenue A with street 2.

In this example configuration, there is an intelligent access point (IAP) at the intersection between B Avenue and $3^{rd}$ Street, that is, at B3. All WRs are either at the intersections of streets or along streets. Therefore the user can set the configuration parameters as shown in FIG. 15. FIG. 15 is an example illustrating a particular configuration dialog box 205 in accordance with an embodiment of the present invention. The user can load the project "Street Deployment" and let the application compute the map. When this project is loaded, only some WRs on $3^{rd}$ street are enabled.

The picture 210 of FIG. 16 shows a very high precision along the $3^{rd}$ street with rapid degradation of location quality when moving away from the center of the street, because all of the active WRs are in a straight line along north-south street 3, i.e. $3^{rd}$ street. FIG. 16 is an example illustrating a location quality map in accordance with an embodiment of the present invention, specifically location quality on $3^{rd}$ street. FIG. 16 is a shaded drawing, with different shades of black and grey representing the different bands. However, in a color drawing, a green band, for example, would follow along north-south street 3, and on either side of the green band is a band of yellow, then a band of blue, then a larger, partially circular band of red, each representing different location qualities. Returning briefly to FIG. 10, distance values equal to or larger than the maximum value are presented in a red color.

By activating, one by one, the other two WRs on the 3$^{rd}$ street, at 3.1 (positioned an equal distance between intersections A3 and B3), and 3.3 (positioned an equal distance between intersections C3 and I3), the location quality on the map changes substantially. These two routers are not in line with the other routers. They are about 10 meters, 20 meters respectively, from the line connecting all other routers. Enabling and disabling any router will show the effect of this change on quality of geo-location in the area around that router.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined.

What is claimed is:

1. A method for determining desired physical locations of reference points for use in identifying geographic locations of mobile terminals in an area of interest within a wireless network, the method comprising:
    inputting information pertaining to a plurality of reference terminals in the wireless network, the information including respective location information for each of the reference terminals;
    generating, based on the input information, a visual display illustrating the locations of the reference terminals, along with a visual indication representing expected levels of precision in geo-location calculations for determining respective geographic locations of the mobile terminals in the wireless network; and
    analyzing the levels of precision in the area of interest to update the visual display with the location information of the reference terminals and the levels of precision in geo-location calculations for determining respective geographic locations of the mobile terminals.

2. The method as claimed in claim 1, wherein:
    the input information includes map parameters; and
    the generating step generates the visual display which includes a map display that is generated based on the map parameters with the respective locations of the reference terminals and the visual indication of expected levels of precision being included on the map display.

3. The method as claimed in claim 2, wherein:
    the information includes respective longitude, latitude and altitude information of each of the respective reference terminals; and
    the map display of the locations of the reference terminals is generated based on the longitude, latitude and altitude information.

4. The method as claimed in claim 2, wherein:
    the information includes signal propagation information indicating respective maximum distances at which signals emitted from the respective reference terminals can propagate; and
    wherein the map display indicating the expected levels of precision in geo-location calculations is generated based on the signal propagation information.

5. The method as claimed in claim 1, wherein:
    the wireless network includes an ad-hoc peer-to-peer wireless network, wherein the reference terminals comprise fixed nodes, and wherein the mobile terminals comprise mobile nodes, in the ad-hoc peer-to-peer wireless network.

6. The method as claimed in claim 1, wherein:
    the inputting step includes inputting the information via a computer; and
    the generating step generates the visual display on a display screen of a computer.

7. A computer-readable medium of instructions, for controlling a device to determine desired physical locations of reference points for use in identifying geographic locations of mobile terminals in an area of interest within a wireless network, the computer-readable medium of instructions comprising:
    a first set of instructions, for controlling the device to receive information pertaining to a plurality of reference terminals in the wireless network, the information including respective location information for each of the reference terminals;
    a second set of instructions, for controlling the device to generate, based on the input information, a visual display illustrating the locations of the reference terminals;
    a third set of instructions, for identifying the expected levels of precision in geo-location calculations for determining respective geographic locations of the mobile terminals in the wireless network; and
    a fourth set of instructions, for updating the visual display with the location information of the reference terminals and the expected levels of precision in geo-location calculations for determining respective geographic locations of the mobile terminals in the network.

8. The computer-readable medium of instructions as claimed in claim 7, wherein:
    the input information includes map parameters; and
    the second set of instructions controls the device to generate the visual display which includes a map display that is generated based on the map parameters with the respective locations of the reference terminals and the visual indication of expected levels of precision being included on the map display.

9. The computer-readable medium of instructions as claimed in claim 7, wherein:
    the information includes respective longitude, latitude and altitude information of each of the respective reference terminals; and
    the second set of instructions controls the device to generate the visual display of the locations of the reference terminals based on the longitude, latitude and altitude information.

10. The computer-readable medium of instructions as claimed in claim 7, wherein:
    the information includes signal propagation information indicating respective maximum distances at which signals emitted from the respective reference terminals can propagate; and
    the second set of instructions controls the device to generate the visual indication representing the expected levels of precision in geo-location calculations based on the signal propagation information.

11. The computer-readable medium of instructions as claimed in claim 7, wherein:
    the wireless network includes an ad-hoc peer-to-peer wireless network, wherein the reference terminals comprise fixed nodes, and wherein the mobile terminals comprise mobile nodes, in the ad-hoc peer-to-peer wireless network.

12. The computer-readable medium of instructions as claimed in claim 7, wherein:
the device includes a computer;
the first set of instructions controls the computer to receive the information; and
the second set of instructions controls the computer to generate the visual display on a display screen of the computer.

13. A geo-location analysis system for determining desired physical locations of reference points for use in identifying geographic locations of mobile terminals in an area of interest within a wireless network, the system comprising:
an input device, designed to input information pertaining to a plurality of reference terminals in the wireless network, the information including respective location information for each of the reference terminals; and
a processor, designed to generate, based on the input information, a visual display illustrating the locations of the reference terminals, along with a visual indication representing expected levels of precision in geo-location calculations for determining respective geographic locations of the mobile terminals in the wireless network, and designed to analyze the levels of precision in the area of interest to update the visual display with the location information of the reference terminals and the levels of precision in geo-location calculations for determining respective geographic locations of the mobile terminals.

14. The system as claimed in claim 13, wherein:
the input information includes map parameters; and
the processor generates the visual display which includes a map display that is generated based on the map parameters with the respective locations of the reference terminals and the visual indication of expected levels of precision being included on the map display.

15. The system as claimed in claim 13, wherein:
the information includes respective longitude, latitude and altitude information of each of the respective reference terminals; and
the processor generates the visual display of the locations of the reference terminals is based on the longitude, latitude and altitude information.

16. The system as claimed in claim 13, wherein:
the information includes signal propagation information indicating respective maximum distances at which signals emitted from the respective reference terminals can propagate; and
the processor generates the visual indication representing the expected levels of precision in geo-location calculations based on the signal propagation information.

17. The system as claimed in claim 13, wherein:
the wireless network includes an ad-hoc peer-to-peer wireless network, wherein the reference terminals comprise fixed nodes, and wherein the mobile terminals comprise mobile nodes, in the ad-hoc peer-to-peer wireless network.

18. The system as claimed in claim 13, wherein:
the input includes an input device of a computer; and
the processor generates the visual display on a device designed for visualizing information in a graphic manner.

* * * * *